Nov. 4, 1969  R. L. STEDFELD  3,476,133

VALVE OPERATED BY RATE OF FLUID PRESSURE CHANGE

Filed Nov. 25, 1966

INVENTOR.
Rowland L. Stedfeld
BY
George E. Johnson
ATTORNEY

United States Patent Office 3,476,133
Patented Nov. 4, 1969

3,476,133
VALVE OPERATED BY RATE OF FLUID PRESSURE CHANGE
Rowland L. Stedfeld, Indianapolis, Ind., assignor to General Motors Corporation, Detroit, Mich., a corporation of Delaware
Filed Nov. 25, 1966, Ser. No. 596,928
Int. Cl. G05b 11/60; F16k 17/04, 31/12
U.S. Cl. 137—115                                      3 Claims

ABSTRACT OF THE DISCLOSURE

Valves having a reciprocable valve member disposed between two pressure chambers one supplied from a source of fluid under pressure through a relatively open passage and the other supplied through a restricted passage so that the valve responds to rapid changes in the pressure. The valve may be restrained in one position by a shear member or by an impositive detent, and may be spring biased.

---

This invention relates to valves and more particularly to valves operated by a predetermined rate of pressure change in a fluid, the flow of which is to be controlled by the valve, a mere change in fluid pressure not being sufficient to effect opening or closing of the valve.

Malfunctioning of a fluid flow system sometimes occurs accompanied by a sudden drop in fluid pressure. As a safety measure it is often advantageous to stop, vent or divert a flow of fluid automatically when such a drop in fluid pressure occurs but not to stop, vent or divert the flow if a gradual and perhaps substantial pressure variation is normally expected.

An object of the present invention is to provide a valve operable by a predetermined rate of pressure change in a fluid and which is not effected by a gradual pressure change in that fluid.

One feature of this invention is a valve having two chambers connected by a calibrated or metering passage so that a predetermined rate of pressure change of fluid in one of the chambers is effective to operate the valve. Another feature is a cylindrical or piston type valve operative by a predetermined rate of fluid pressure change to shift from one position to a second position.

Added features will become apparent as the description proceeds.

Figure 1:
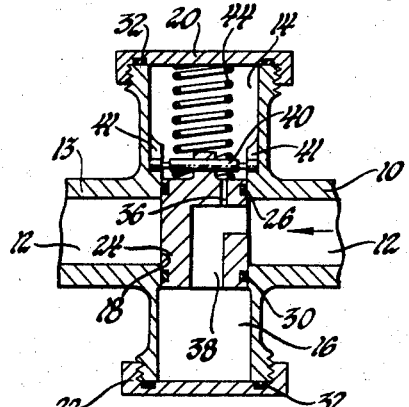
FIGURE 1 is a sectional view drawn through a valve representing one embodiment of the present invention.

In FIGURE 1 of the drawings an X-form of valve body is shown in 10 as defining a fluid flow path 12 extending straight across the body and two pressure chambers 14 and 16 in alignment with an intermediate or connecting valve chamber 18. The three chambers 14, 16 and 18 are coaxial and are arranged transverse to the passage 12. The body 10 is provided with two covers 20 and 22 tightly closing the pressure chambers 14 and 16 respectively, and communication between the latter two chambers is sealed off to a large extent by a piston-type element 24 provided with ring seals 26 and 30. It will be appreciated that when the occasion arises, as will be seen, the piston-type valve element 24 may move axially in the chamber 18 and extend almost wholly into the chamber 16. Each of the covers 20 and 22 is provided with a sealing means 32. A small passage 36 meters the flow between the passage 12 and the chamber 14, whereas a large passage 38 also formed in the valve element 24 causes pressures in the passage 12 and the chamber 16 to be about equal.

In the operation of the valve of FIGURE 1 and during a steady pressure condition or slow pressure change condition in the passage 12, the pressure chambers 14 and 16 are equally or almost equally pressurized because of the calibrated or metering passage 36 and the passage 38 connecting the passage 12 to the chamber 16. With the valve element 24 positioned as shown in the drawing, it is positively held in that position by a shear pin 40 which has its end retained in recesses 41, and this pin serves to retain the valve element in position to close the passage 12 despite the force of a coil spring 44 arranged in the chamber 14 and acting against the element. If there is a sudden pressure change in the passage 12, that change will be more quickly apparent in the chamber 16 than in the chamber 14 because of the difference in cross-sectional sizes of the passages 36 and 38. This creates an unbalanced force on the valve element 24 and when a predetermined pressure change is achieved the differential pressure on the valve element will be sufficient to shear the pin 40, and that pressure plus the force of the spring 44 will cause the element 24 to drop or slide into the pressure chamber 16 and thereby fully open the passage 12 through the outlet branch 13 of the valve body.

Figure 2:
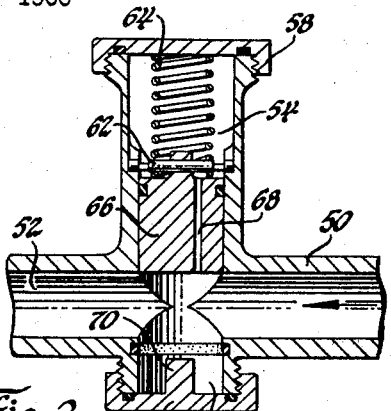
FIGURE 2 is a view similar to that of FIGURE 1 and showing a second embodiment of the invention.

In FIGURE 2 a valve body 50 is depicted which is somewhat like the valve body 10 of FIGURE 1 in that it defines a flow passage 52 which extends transverse to the axis of two pressure chambers 54 and 56. The latter two chambers are closed by means of covers 58 and 60, respectively. A shear pin 62, as well as a coil spring 64, are utilized in the chamber 54 with the pin serving to hold a piston-type valve element 66 in its open position insofar as the passage 52 is concerned. A metering passage 68 extends through the element 66 and connects the passage 52 with the pressure chamber 54. The cover 60 has an inwardly extending projection 70 adapted to serve as a stop for the valve element 66 when the latter should be propelled to its closed position by virtue of shearing of the pin 62 and the action of the spring 64 when a requisite differential pressure is exercised upon the element 66.

Figure 3:
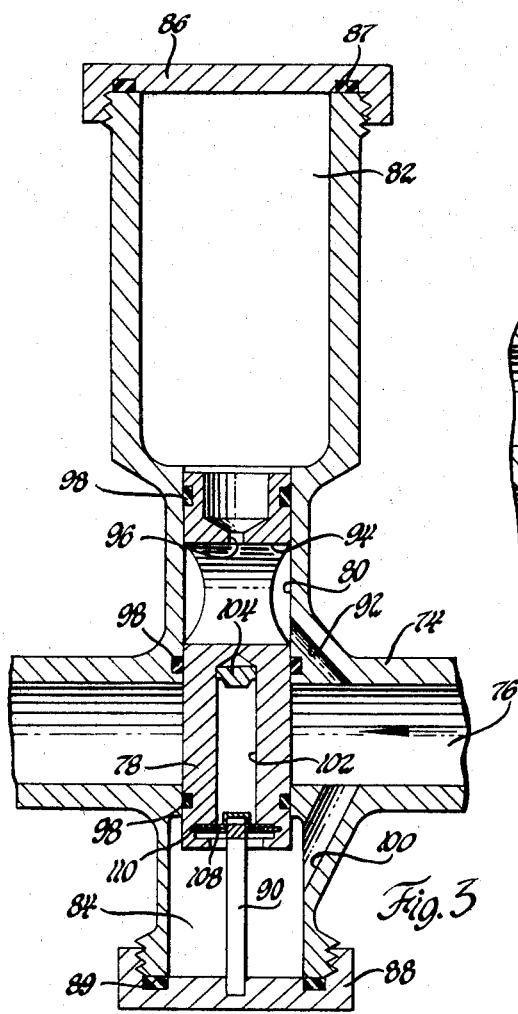
FIGURE 3 shows a third embodiment.

In FIGURE 3 the same principle of operation is utilized as in FIGURES 1 and 2, but in this embodiment of the invention no spring means is used. In this particular embodiment a valve body 74 is shown having a main fluid flow passage 76 extending through it, and this passage is controlled by a piston-type valve member 78. The latter is slidable in a valve chamber 80 defined by the valve body, and the chamber 80 extends to a large pressure chamber 82 at one side of the body 74 and to a smaller pressure chamber 84 at the other side of the body 74. The large chamber 82 is closed by means of a cover 86 sealed at 87 and the smaller chamber is closed by a cover 88 sealed at 89. The cover 88 carries an elongated magnet 90 which extends upwardly and toward the valve chamber 80. A metering passage 92 connects the chamber 76 with a cylindrical transverse passage 94 formed in the valve element 78. One side of the passage 94 is connected by an aperture 96 to the large pressure chamber 82. A sealing means 98 in the form of rings is utilized between the valve element 78 and the cylindrical wall surface of the valve chamber 80. A passage 100 larger in diameter than the metering passage 92 or the aperture 96 in the body 74 connects the passage 76 with the small pressure chamber 84. A bore 102 is made to extend from one end of the valve element 78 into the latter a distance short of the passage 94. A magnet 104 is fixed with the closed end of the bore 102. A shear disc 108 is retained at the otherwise open end of the bore 102 by means of a spring washer 110. The disc 108 is such as to be attracted by the magnet 90.

In the operation of the valve of FIGURE 3, a sudden drop in pressure within the flow passage 76 will be reflected in the chamber 84 and will cause the piston element 78 to lower and shear the disc 108, despite the influence of the magnet 90 tending to hold the valve element 78 in its closed or upper position with relation to the passage 76. If the valve element 78 is lowered and disc 108 sheared by virtue of the sudden drop in pressure, the second magnet 104 will tend to hold the valve element 78 in its down or open position. It will be noted that the chamber 82 must be larger than the chamber 84 so that as the piston type valve 78 moves toward the chamber 84, the chamber 82 volume will not be expanded so fast that the pressure therein drops below that of chamber 84 or the passage 76.

Figure 4:
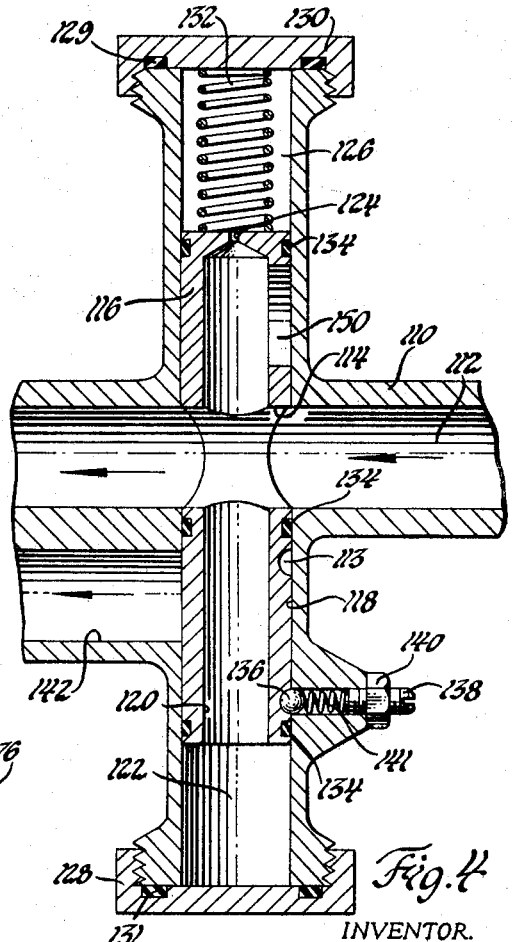
FIGURE 4 depicts a fourth embodiment which operates on the principle of the valves of FIGURES 1, 2 and 3 except that a bypass for the fluid being controlled is involved.

In FIGURE 4 a valve body 110 is shown defining a normal flow passage 112 which, when open, is made continuous by a passage 114 formed in a cylindrical piston-type valve element 116. The latter is slidable in a valve chamber 118 and bears a large axial passage 120 which is open at one side of the body 110 to communicate with a pressure chamber 122 and has a calibrated aperture 124 at its other end and connecting it to a pressure chamber 126 also defined in the body 110. The pressure chambers 122 and 126 are provided with covers 128, 130, respectively. These covers are sealed as at 129 and 131. A coil spring 132 is located in the chamber 126 and acts between the cover 130 and one end of the valve element 116. Sealing rings 134 are utilized to seal the annular clearance necessarily left between the piston element 116 and the wall surface of the valve chamber 118 to permit axial sliding action of the valve element. A ball detent arrangement 136 is utilized to hold the valve element 116 in its raised or open position with respect to the flow passage 112. A recess 113 is formed in the valve element 116 to cooperate with the detent arrangement when the valve element is lowered. The breakaway load of the detent arrangement 136 is made adjustable by means of a screw 138 and a nut 140 retaining a spring 141. The valve body 110 also defines a bypass flow passage 142 which is parallel with the main flow passage 112 and communicates with the valve chamber 118 under control by the valve element 116.

In the operation of the FIGURE 4 modification, a sudden drop in pressure in the flow passage 112 will cause the differential pressure exerted on the valve element 116 to cooperate with the spring 132 and overcome the holding power of the detent arrangement 136 and lower the valve element 116. When this occurs, flow from the main passage 112 is diverted through a valve element passage 150 and into the bypass passage 142. The passages 150, 120 and the passage 114 in the valve element 116 thereby together serve as an auxiliary passage. Although not shown, the valve element 116 of FIGURE 4 could be provided with an externally operable reset, thus avoiding disassembly after valve actuation by the differential fluid pressure.

It will be noted that the modifications of FIGURES 1, 2 and 3 are "one shot" devices. Each must be disassembled and the shear members replaced after actuation. The FIGURE 4 valve may be reset by removing the cover 128.

I claim:

1. A valve having a body defining a fluid flow path as a source of fluid pressure, two pressure chambers and a valve chamber, a piston type valve element slidable in said valve chamber and interposed between said two pressure chambers, said valve element being arranged to control said flow path, at least portions of said three chambers being in axial alignment with said valve element, releasable means retaining said valve element in one position actuatable by differential pressure acting upon said valve element, a calibrated metering passage connecting one of said two pressure chambers to said path, a passage larger than said metering passage connecting the other of said pressure chambers to said path, a bypass passage defined by said body and communicating with said valve chamber, and an auxiliary passage extending through said valve element, the arrangement being such that a sudden drop in pressure in said path will effect release of said valve element and communication of said flow path with said bypass passage.

2. A valve such as set forth in claim 1, said one of said two pressure chambers enclosing spring means acting against said valve element.

3. A valve such as set forth in claim 1, said calibrated metering passage and larger passage being formed in said valve element.

References Cited

UNITED STATES PATENTS

| | | | |
|---|---|---|---|
| 942,042 | 11/1909 | Petley | 137—465 |
| 975,259 | 11/1910 | Lahmers | 137—465 XR |
| 1,119,287 | 12/1914 | Krichbaum | 137—460 |
| 2,711,186 | 6/1955 | Perez | 251—297 XR |
| 3,174,500 | 3/1965 | Johnson et al. | 137—115 |

ROBERT G. NILSON, Primary Examiner

U.S. Cl. X.R.

137—456, 461, 465, 467; 251—297